United States Patent [19]
Thompson et al.

[11] 3,802,522
[45] Apr. 9, 1974

[54] BATCH WEIGHING SYSTEM

[75] Inventors: Thomas L. Thompson; C. Wayne Lafitte, both of Houston, Tex.

[73] Assignee: Houston Controls Systems, Inc., Houston, Tex.

[22] Filed: Oct. 10, 1972

[21] Appl. No.: 296,307

[52] U.S. Cl................ 177/121, 177/165, 177/185, 177/212
[51] Int. Cl. .... G01g 13/04, G01g 23/10, G01g 7/00
[58] Field of Search .......... 177/120, 121, 165, 212, 177/DIG. 11, 116, 185

[56] References Cited
UNITED STATES PATENTS

| | | | |
|---|---|---|---|
| 2,922,610 | 1/1960 | Bale, Jr. | 177/116 |
| 2,673,060 | 3/1954 | Svensson | 177/121 |
| 2,833,506 | 5/1958 | Gunderson | 177/120 |
| 3,195,662 | 7/1965 | Joiner et al. | 177/120 X |
| 3,705,636 | 12/1972 | Dunphy et al. | 177/120 X |

FOREIGN PATENTS OR APPLICATIONS

| | | | |
|---|---|---|---|
| 969,642 | 9/1964 | Great Britain | 177/212 |
| 900,609 | 7/1962 | Great Britain | 177/212 |

*Primary Examiner*—George H. Miller, Jr.
*Attorney, Agent, or Firm*—Ralph R. Browning; C. James Bushman

[57] ABSTRACT

An apparatus for high speed batch weighing of products which flow into a scale hopper under control of the scale and its associated control systems. A pickoff measures scale displacement with increasing product load and applies corrective signals to a linear motor to balance the product load while simultaneously providing the effect of viscous damping to the scale. The scale control system also maintains product feed rate to the scale hopper at the maximum possible rate consonant with the weight accuracy standard desired while automatically adjusting scale tare between weighings.

20 Claims, 7 Drawing Figures

BATCH WEIGHING SYSTEM

BACKGROUND OF THE INVENTION

The field of the invention is generally related to repetitive batch weighing of products either as a step in their packaging for sale or use or, for use in product mixtures. More particularly, the invention relates to a batch weighing control system with associated scale that improves the accuracy of the weighing process while at the same time increasing its speed.

There are a great variety of commercial and industrial applications for repetitive batch weighing systems. In the forefront numerically as to quantity of applications, is the food and household product packaging industry where many products are boxed, bagged, or bottled for ultimate sale, not by volume, but by net weight. This packaging of foods and other household products has increased many orders of magnitude in the last few years, both as to number of applications and the quantity of packages in each application. With this increase in quantity, the packaging methods and machinery have grown steadily more sophisticated and faster. But, the pace of these improvements has often been slowed by the one common denominator of all the various methods and machines employed, the need to accurately weigh the product being packaged.

While there have been improvements in weighing devices and systems, these improvements have not kept pace with the other packaging machinery developments. In fact, where speed was important, it has often been necessary to sacrifice weight accuracy and purposely fill packages to an overweight condition to prevent a consumer outcry against short weights. However, even where not illegal, overfilling is a very expensive practice and since its use quickly cancels out any speed advantage it permits, it is highly desirable that it be at least substantially reduced.

One of the methods used in the prior art to increase weighing speed and accuracy has been the use of systems analogous to a vernier. Material is delivered to a scale in bulk at high volumes and with limited accuracy to a weight somewhat less than that desired and then, a much finer or dribbling feed rate is used to bring the weight up to that required. Because of the vagaries of the product delivery systems including, but not limited to, product flow characteristics, humidity, feeder mechanical conditions, supply hopper fill level, depth of material in the scale hopper and the weighment amount, it is normally necessary where accuracy is required, to cut off bulk feed substantially before the desired weight. After the bulk feed cutoff, the product is then dribbled slowly to the final weight. However, an early cutoff of bulk feed and a relativley longer dribbling mode results in the feeding and weighing operation taking so long that the packaging machines often need to wait for this operation to be completed.

Another prior art method of achieving increased batch weighing speed utilizes a damping function superimposed on the material delivery rate. In this method, the weighing system comprising the scale, material feed apparatus and control system, is treated as a uni-directional closed loop servo system. The scale provides an output feedback signal proportional to the selected tare weight of the package. This signal is used as feedback to vary the product delivery rate toward zero as the selected weight is approached. If such a system is exactly calibrated to critical damping, the feedback signal could actually reduce the product delivery rate to zero at the instant of reaching the selected tare weight. However, such critical damping is difficult to achieve since most systems are non-linear when selected weights and product materials are changed. Further, even when achieved, the latter stages of each product weighment tend to be long in proportion to weighment accuracy standards, since product delivery is approximately asymptotic to the selected weight.

SUMMARY OF THE INVENTION

It is accordingly a principal object of the invention to provide a batch weighing scale and control system that improves both the speed and accuracy of the weighing process. This object is achieved by considering and optimizing all elements of the product weighing and delivery system that are amenable to improvement through sophistication of the control system and its weighing components. Thus, by improved control a novel force balance type of scale is converted to the equivalent of the more accurate mass balance scale by cancellation of acceleration components. This permits a weighing speed increase to that achievable with a force balance while maintaining the greater accuracy of the mass balance. Simultaneously, the scale output signals are used to maintain the product delivery rate as high as possible for the maximum time possible without overfilling. These delivery rate and product flow cutoff time controls are achieved by measuring the amount of product over or under weight on a given weighing cycle and then, using this weight error as a system servo error signal to maximize product feed rates and the material flow cutoff point.

DESCRIPTION OF THE PREFERRED EMBODIMENTS

OVERALL SYSTEM OPERATION

Figure 1:
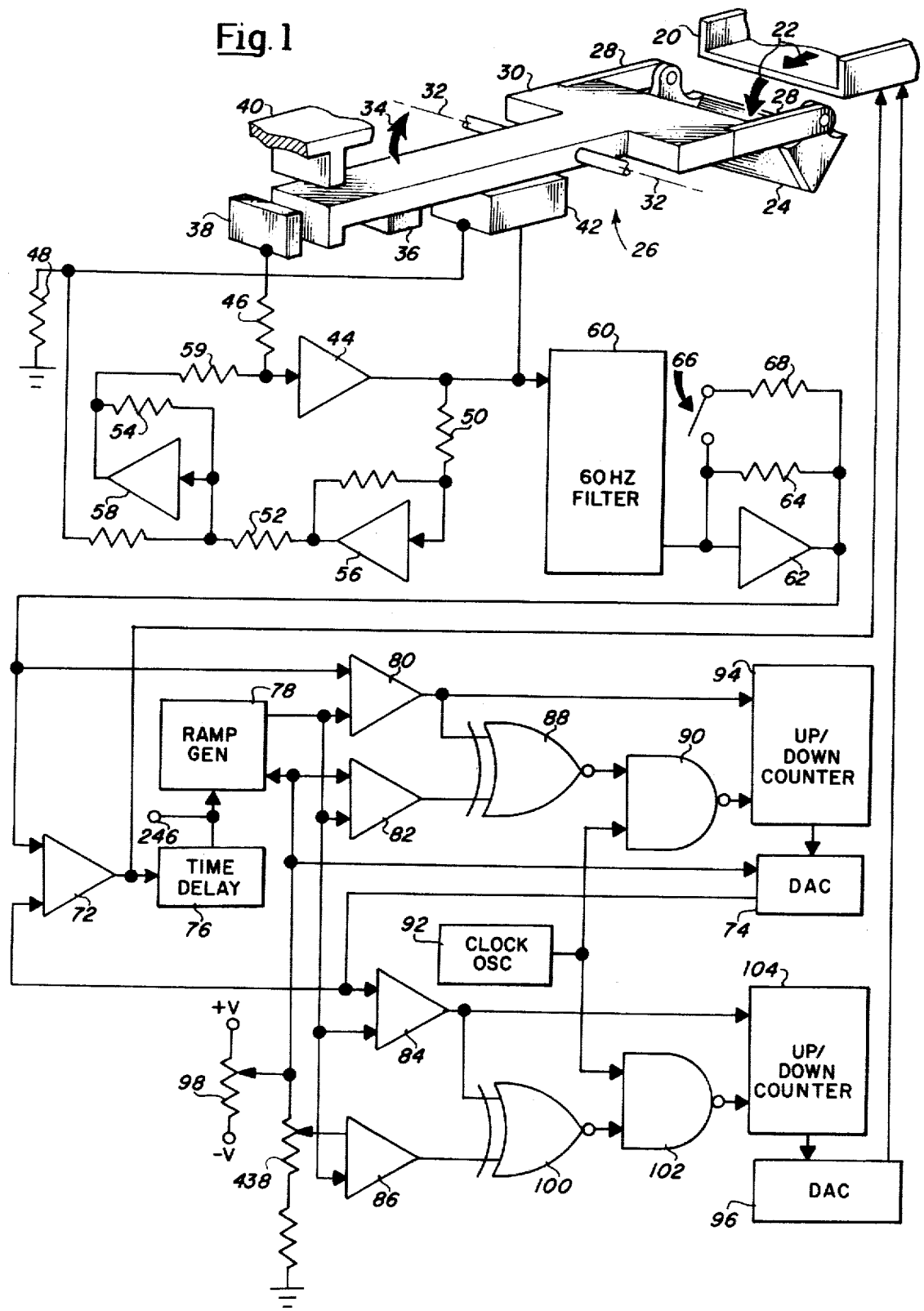
FIG. 1 is a simplified mechanical and electrical schematic partially in block diagram form illustrating the principal components of the inventive weighing apparatus.

FIG. 1 schematically illustrates the principal mechanical and electrical components of the inventive weighing system. Material to be weighed is transported by a feed device 20 in the direction of arrows 22 toward the hopper 24 of the scale/force balance generally indicated at 26. Feed device 20 is advantageously an electrically driven vibratory type although, as will become apparent from the description which follows, any feed device which is amenable to proportional feed rate control and sharp feed cutoff can be employed.

Scale 26 comprises the hopper 24 supported on extensions 28 of lever arm 30 which, in turn, pivots about the bearings schematically indicated at 32. As the hopper is filled, lever arm 30 is deflected in the direction of arrow 34 causing increasing amounts of light from source 36 to impinge upon photo sensor 38. A mechanical stop 40 limits travel of the lever arm 30.

Figure 2:
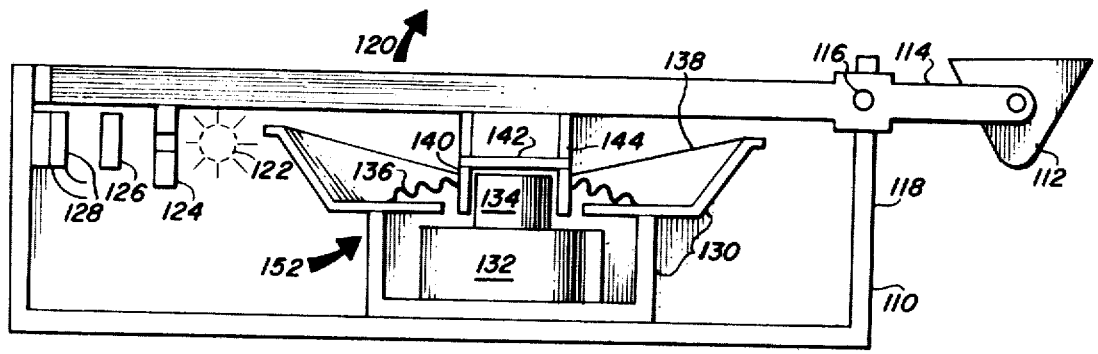
FIG. 2 is a schematic representation of one embodiment of a servo controlled scale/force balance-transducer useful in the practice of the invention.

Block 42 schematically illustrates a simple linear electric motor whose basic design is described in detail in conjunction with FIG. 2. of the drawing. Motor 42 comprises an electromagnet coil moving in the field of a permanent magnet stator so that current in the coil will generate a force in one direction or another. When lever arm 30 deflects with increasing weights in hopper 24, the resultant output signal of sensor 38 is applied to amplifier 44 across resistor 46 to cause a correction current to flow in the coil of motor 42 to produce a restoring force equal in magnitude to that caused by the weight of product in hopper 24. Since movement of the coil is insignificant, the correction current is proportional to the weight in the hopper.

The current flowing in the coil of motor 42 is proportional to the voltage appearing across resistor 48. Resistors 50, 52, and 54 are selected so that with the coil of motor 42 in an at rest condition, coil voltage as inverted by amplifier 56 is subtracted from the voltage across resistor 50 to bring the output of amplifier 58 to zero for this at rest condition. Then, whenever lever arm 30 is displaced, the induced EMF output which appears across the motor's coil will, in turn, cause a voltage to appear at the output of amplifier 58 which is proportional to arm or coil velocity. This voltage when summed across resistor 59 with that due to the change in position voltage across resistor 46 provides the equivalent of viscous damping in the position servo loop and increases stability. Viscous damping occurs because the current in the coil is the result of both the applied voltage from amplifier 44 and the induced EMF caused by motion of the coil in the magnetic field. The induced voltage is of a polarity opposite to the voltage required to drive the coil in the direction it is moving. A detailed discussion of this damping circuitry is included with the description of FIG. 4.

Many of the product feed mechanisms employed with packaging machinery to deliver material to the scale are of a vibratory type. Since they are driven by the 60Hz power line they vibrate mechanically at that frequency. The resultant induced vibration in the entire structure is an inescapable input to the scale. As a result, the voltage in the coil of motor 42 is modulated with a 60Hz component when the feed mechanisms are operating. To remove this undesired component a filter 60 is placed in series with the output of amplifier 44. Advantageously, this filter is a twin "T" tuned to reject 60 cycles. To achieve a 20 db reduction in 60 cycle signals with a conventional simple RC filter, the corner frequency must be at least 6 Hz, and this would introduce lag that would seriously degrade system response. However, the sharp notch rejection achieved by a twin "T" filter does not have this problem and causes an insignificant degradation in servo response.

The series resistance of the filter 60 and the feedback resistor 64 around amplifier 62 are used to calibrate or adjust the output of amplifier 62 to a desired amplitude range. To change this range for different measured product weights, there is provided switch 66 and resistor 68. Switch resistor 68 in or out of the circuit provides such a range change. The output of amplifier 62 is an analog voltage proportional to the voltage across the coil resistance and thus, to the weight supported in hopper 24.

The weight the scale is to measure is set into a weight set potentiometer 98 having suitably calibrated setting indicia (not shown). The voltage across potentiometer 98 is provided by amplifiers whose operation is described further hereinbelow. Amplifier 72 is a differential amplifier and compares the scale output voltage appearing at the output of amplifier 62 to the output of a digital-to-analog converter 74.

Assume the vibratory feeder 20 is operating and the product whose weight is to be measured is falling into hopper 24. As this continues the output of amplifier 62 rises. When that voltage is equal to the output of converter 74, the output of amplifier 72 turns off feeder 20 and initiates a time delay of fixed duration controlled by circuit 76. The time delay is chosen empirically but maintained as short as possible while allowing for any material flowing after feeder cutoff to reach hopper 24 — with some additional time to allow the scale servo to settle to a static value. At the end of this time delay period, ramp generator 78 is energized. The output is a positive going voltage ramp applied to the inputs of differential amplifiers 80, 82, 84, and 86.

Amplifiers 80 and 82 drive an Exclusive OR, 88, whose output applied through NAND 90, gates pulses from clock oscillator 92 to up/down counter 94. The scale output from amplifier 62 is applied to amplifier 80 and the signal corresponding to the commanded weight as established by potentiometer 98, is applied to amplifier 82. If these two signals are not equal, the Exclusive OR 88 will generate an output signal during the time interval the ramp output voltage is between those two voltages. If the scale output voltage is smaller than the commanded weight, amplifier 80 will have an output signal before amplifier 82 does and will cause the up/down counter to count up. If the scale output voltage is greater than the commanded weight, the up/down counter 94 will count down while clock pulses are applied through NAND 90. The resulting change in the output of converter 74 is applied to differential amplifier 72 to alter the feeder cutoff point for the next weighment.

Summarizing the operation of the weight control servo system, after each filling of hopper 24, all the material flowing after feeder cutoff is allowed time to reach the scale hopper and the scale to settle out. Then, the weight signal from the scale is compared to the commanded weight signal set at potentiometer 98. If the two signals are the same, no change is produced in the output of digital-to-analog converter 74. If a difference exists between the two signals, the output of converter 74 will correct the cutoff point of feeder 20 for the next weighment. Control of the dumping of hopper 24 is outside the scope of the invention. However, the gate pulse on terminal 246, shown schematically at the output of time delay 76 has been utilized in most embodiments to date to effect that control. See the detailed description of FIG. 4, 5, and 6 for a fuller description. Further, since the schematic of FIG. 1 is of a simple version of the inventive apparatus, no provision is shown therein for the dribble product feed mode.

It is a feature of the invention that the above described weight control servo system supplies the command weight voltage signal to the ramp generator to control the ramp slope and that the command signal is also applied to converter 74 to control the amplitude of its output signal. The ramp slope thus becomes a function of the command weight signal and the output of converter 74 becomes a percentage of the commanded weight signal. This assures that for a given percentage error between actual weight and command weight, a constant percentage correction is applied through converter 74.

The rate at which the product is fed to the scale hopper by feed device 20, is controlled by the output of digital-to-analog converter 96. The voltage ramp output of ramp generator 78 is applied to differential amplifiers 84 and 86. The ramp voltage is compared with the output of converter 74 in amplifier 84 and with the output of "speed set" potentiometer 438 in amplifier 86. As can be seen, the voltage across potentiometer 438 is the voltage that results from the setting of weight set potentiometer 98. Therefore, the setting of potentiometer 438 results in an output voltage that is a percentage of the weight set and here, is used as a speed setting for feed device 20. As described further below, the output voltage of potentiometer 438 is also used to control product feed cutoff.

The amount of product material that is delivered to the scale hopper after the feed device is shut off, is termed overfeed. As is perhaps obvious the amount of overfeed is a direct function of feed device speed. As feeder speed is increased and with it overfeed, the output of converter 74 will decrease to a smaller percentage of command weight.

Amplifiers 84 and 86 control up/down counter 104. If the output of converter 74 is not equal to the speed set voltage generated by potentiometer 438, converter 96 will compensate by adjusting the speed of feed device 20. Thus, feeder speed is controlled by monitoring the amount of over (or under) feed being experienced. Actual speed adjustment of the feeder is adjusted so that loop gain of this servo is less than the gain of the weight control servo loop. This assures a slower response in the speed control loop and avoids the oscillations that would otherwise result if the response was the same as for the weight control loop.

The speed control circuitry functions as follows. Amplifiers 84 and 86 drive an Exclusive OR 100. The output of Exclusive OR 100 is applied to NAND 102 which, in turn, gates pulses from clock oscillator 92 to up/down counter 104. Whenever the output of counter 74 is not equal to the speed control signal from potentiometer 98, Exclusive OR 100 will generate an output signal during the time interval the output of ramp generator 78 is between those two voltages. If the output of converter 74 is smaller than the speed control signal, amplifier 84 will have an output signal prior to any output signal from amplifier 86. This will cause the up/down counter to count up and, of couse, conversely or down if the converter 74 signal is greater than the speed control signal. The number of up or down pulses is determined by clock oscillator 92 and the time interval during which its output pulses are applied to up/down counter through NAND 102. The resulting change in the output of converter 96 is applied to feeder 20 to alter the feeder rate. The clock frequency generated by oscillator 92 is selected arbitrarily to cause the feed rate (and weight cutoff) to approach its desired level asymptotically but, the control circuit constants are selected to give the feed rate control a much slower response than the feed cutoff system. Thus, the feed cutoff can respond to short term variations in product characteristics or flow rates without causing any significant offset from the desired feed rate levels.

THE FORCE BALANCE SCALE

FIG. 2 shows schematically a servo controlled scale 110 of the force balance type most useful in the inventive weighing system. Other than the scale sensor system, scale 110 is substantially similar to that shown in FIG. 1 but is shown in greater detail. The material to be weightee is poured or otherwise directed into hopper 112. Hopper 112 is supported on lever arm 114 which pivots about bearing 116. Bearing 116 is supported in frame 118. As weighed hopper is filled, lever arm 114 is deflected in the direction of arrow 120. This movement varies the amount of light from source 122 passing through slit mask 124, photocell aperture plate 126 and impinging on photo sensor 128.

As described in connection with FIG. 1, the output of sensor 128 is amplified and applied to linear motor 152 which opposes displacement of the lever arm 114. As shown and advantageously for cost reasons, linear motor 152 is a conventional electro-mechanical loudspeaker. The amplified detector voltage applied to motor 152 causes the motor to attempt to hold its coil 140 and with it, lever arm 114 to which it is attached, motionless even though a displacing force is applied by the filling or filled hopper. Since motion of the coil is small enough to be insignificant, motor current and hence motor voltage, is directly proportional to the displacing force or weight. As shown the linear motor 152 comprises a yoke and basket assembly 130, a permanent magnet 132 with attached pole piece 134. Suspension 136, cone 138 and coil 140 with dust cover 142 complete the basic linear motor/loudspeaker assembly. Secured to dust cover 142 is a support piece 144 which is also secured to lever arm 114.

SCALE POSITION PICKOFF

Figure 3:
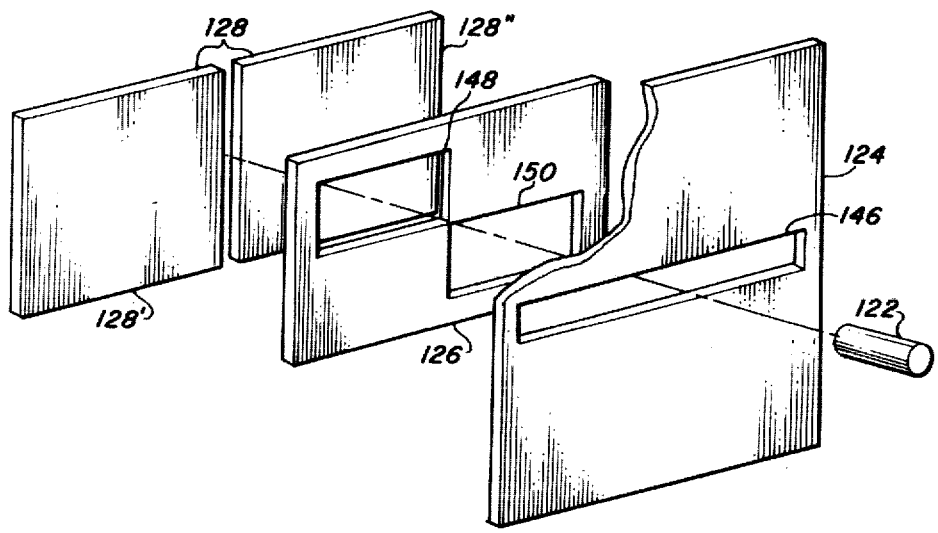
FIG. 3 is a schematic of a presently preferred form of electro-optical pickoff of measuring scale deflection.

The optical schematic of FIG. 3 illustrates a preferred form of electro-pickoff and the one shown in FIG. 2. Lamp 122 continuously illuminates the slit 146 in slit mask 124. If the slit 146 is perfectly centered vertically, light will pass through apertures 148 and 150 in plate 126 in equal amounts and illuminate sensors 128' and 128'' equally. Of course, any movement of slit 146 as occurs with changing loads, will cause light to fall on one sensor more than the other and cause an error signal to be generated to apply further correcting forces to the scale moment arm.

SCALE CONTROL CIRCUIT

Figure 4:
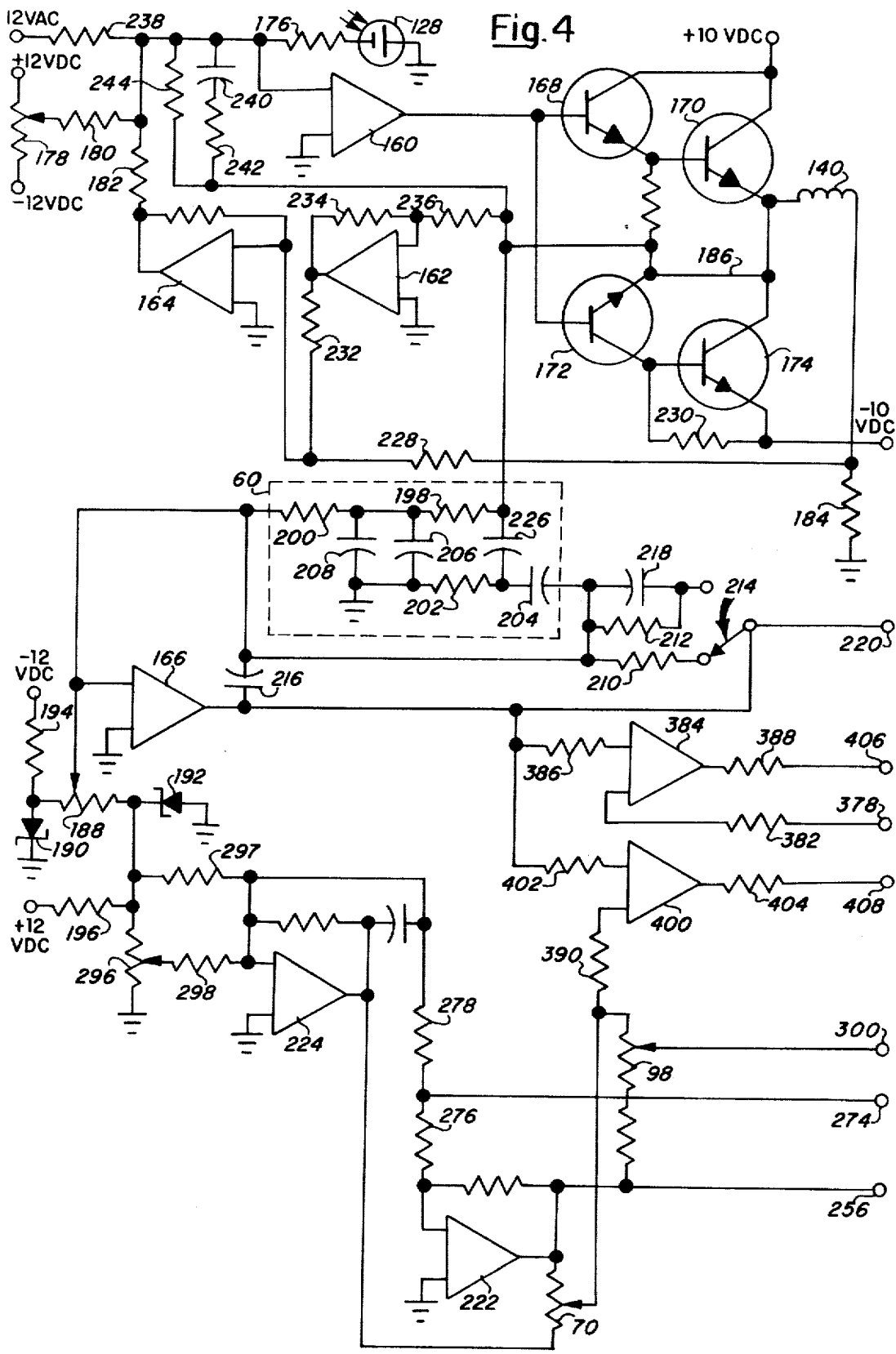
FIG. 4 is an electrical schematic illustrating in detail that portion of the control circuitry used for the servo controlled scale force balance.

FIG. 4 illustrates in detailed schematic form, the scale weight control circuitry of the invention. As discussed above, the restoring force on the scale is provided by a linear motor having a coil positioned in a magnetic field. The position of the motor coil is sensed by a photosensor and when the scale beam and coil are displaced from their null position, the scale control circuits apply a current to the coil to develop a restoring force. The scale control circuits consist of operational amplifiers 160, 162, 164, and 166, transistors 168, 170, 172, and 174 with their associated feedback and coupling resistors and capacitors.

The output of photosensor 128 is applied through resistor 176 to amplifier 160 and that amplified output drives transistors 168 and 172. Transistors 168 and 170 comprise a Darlington type amplifier. Transistors 172 and 174 are cascaded common emitter amplifiers. Effectively, these four transistors act as a complementary common collector pair with transistor 170 conducting the majority of the current when the signal from amplifier 160 is positive. When the output of amplifier 160 is negative, transistor 174 conducts most of the current. In this manner, there is provided a high current/complementary amplifier to drive the motor coil. Potentiometer 178 provides an offset current through resistor 180 into amplifier 160. This adjustment compensates for amplifier offset and for mechanical offset in the scale assembly.

If the input current through resistor 182 to amplifier 160 is ignored, the foregoing is a complete closed loop which will maintain the coil in a fixed position. However, were it not for applicants' novel damping circuit loop gain would necessarily be low to achieve stability and hence, the response time of the scale would be very slow – on the order of 200 milliseconds to a unit step function input. However, amplifiers 162 and 164 provide a velocity component signal which is used to introduce the equivalent of viscous damping into the system. This permits higher gains and the achievement of a response rate on the order of 60 milliseconds. A 60 millisecond response rate is far better than that achieved by other contemporary scales which at their fastest, achieve approximately a 200 millisecond response time and that, only at the sacrifice of accuracy.

The current for motor coil 140 is drawn through resistor 184 to ground. The voltage developed across this resistor is therefore proportional to coil current.

When a load is applied to the scale hopper, the coil is moved producing an induced EMF, which may either aid or buck the voltage applied to the coil on line 186. The voltage applied to the coil 140 on line 186 tends to cause the coil to move back toward its null point. This voltage also causes current to flow in resistor 184 and the resultant voltage is applied through resistor 228 to amplifier 164. Coil voltage is applied through resistor 236 to amplifier 162, which inverts that voltage. The inverted coil voltage is applied through resistor 232 to amplifier 164. The output of amplifier 164 is thus coil current minus coil voltage. This term is proportional to coil velocity since the induced EMF due to motion is of a polarity opposite to an applied voltage which would cause such motion.

The term proportional to coil velocity at the output of amplifier 164 is summed with the displacement sensor output at the input of amplifier 160. If the coil is stationary the output of amplifier 164 is zero. If the coil moves, the output of amplifier 164 is a voltage proportional to velocity which, because of its polarity when applied to amplifier 160, opposes that motion whatever its direction. The result is the equivalent of viscous damping — an opposing force portional to velocity.

From a mathematical standpoint, the foregoing can be explained in terms of the following computation:
V = coil velocity
E$r$ = induced coil voltage = K$_1$ V E$_A$ = voltage applied to coil 140 on line 186
R$_{184}$ = resistance of resistor 184
R$c$ = coil resistance
E$i$ = instantaneous voltage across resistor 184
Then:

$$E_i = R_{184} (E_A - E_r/R_c) \quad (1)$$

and since $$E_r = K_1 V$$

Then:

$$K_1 V = E_a - E_i (R_c/R_{184}) \quad (2)$$

Amplifiers 164 and 162 solve equation (2) for a velocity component and supply it through resistor 182 to the input of amplifier 160 where it is subtracted from the sensor command signal. The constant K$_1$ is calibrated in resistor 182. This introduction of a velocity component into the servo loop permits a decrease in the response time of the servo to approximately 60 milliseconds. It also permits an increase in loop gain to provide a stiffer loop and maintenance of coil displacement at a very low level, on the order of a 0.005 inch for loads within the scales capacity.

As pointed out above, the coil voltage is also fed through a 60 cycle filter network 60 to an output amplifier 166. Filter network 60 comprises resistors 198, 200 and 202 and capacitors 204, 206, 208, and 226. Those elements make up a twin "T" filter which achieves sharp notch rejection without introducing any significant amount of lag. Use of this filter reduces by 20 db the 60 Hz signals present because of the vibratory feeders. Amplifier 166 serves a multiple purpose. It also permits setting of the scale tare voltage to zero. This is accomplished by adjustment of potentiometer 188 while the scale is holding zero weight so that under this condition the output of amplifier 166 is zero. Potentiometer 188 is supplied from a − 12V DC source regulated by zener diodes 190 and 192 and resistors 194 and 196.

Since amplifier 166 is the scale output amplifier, adjustment of the gain through changing its feedback resistors permits the same scale and servo system to operate over an expanded range. This range switching is achieved by selecting either resistors 210 or 212 as the amplifier feedback resistor through operation of switch 214.

The feedback circuit of amplifier 166 also permits additional filtering. Capacitors 216 and 218 in the amplifier 166 feedback circuit are a special filter to remove acceleration components from the scale's output. For example, when a particle is dropped on the scale, the scale must decelerate that particle to zero velocity. The force required to achieve the deceleration would show up as a sharp overshoot in scale output were it not for this filter. Capacitors 216 and 218 simply integrate that overshoot voltage and are more or less open loop calibrated to bring the scale output voltage to its static level before the acceleration pulse is completed.

The scale output appears at terminal 220. The scale output is also applied through resistors 386 and 402 to differential amplifiers 384 and 400, respectively. The output of amplifier 384 is applied through resistor 388 and terminal 406 to external circuitry which cuts off product bulk feed. The output of amplifier 400 is applied through resistor 404 and terminal 408 to external circuitry which terminates product dribble feed and which may be used to actuate the hopper 24 dump cycle.

WEIGHT CONTROL CIRCUITS

The voltage across potentiometer 70, used for setting in the weight the scale is to measure, is advantageously provided by the output of amplifiers 222 and 224. The outputs of amplifiers 222 and 224 are simultaneously controlled by an automatic tare voltage input at terminal 274. A positive voltage input to amplifier 224 is developed across potentiometer 296 and resistors 297 and 298. With a zero volt automatic tare signal on terminal 274 the output of amplifier 222 is zero and the output of amplifier 224 is negative and equal in magnitude to the net voltage across weight set potentiometer 70. The setting of potentiometer 296 is made with a zero automatic tare voltage, and is adjusted so that the voltage across weight set potentiometer 70 is substantially equal to the maximum scale voltage to be developed at terminal 220 for the maximum weight the scale is to measure. For example, if the scale is to measure between 0 and 5 ounces, the voltage across the weight set potentiometer is adjusted to be equal to the scale output voltage when five ounces is being weighed. The generation of an automatic tare voltage signal is discussed in detail below, but as can be seen if that voltage signal is varied its effect will be to shift the output of amplifiers 222 and 224 by equal amounts merely shifting the voltage across weight set potentiometer up or down with respect to ground but without changing the net voltage span across it.

Amplifiers 222 and 224 in addition to establishing the voltage across potentiometer 70 are also used in providing the automatic tare control function of the invention. This control is necessary to enable adjustment of the zero point to compensate for product build-up in the scale hopper or other mechanical changes in the scale mechanism. These effects can be significant in their effect on accuracy of the individual weighments. To achieve this control, the automatic tare circuitry moves the zero point of the weight set potentiometer with respect to ground until it equals the scale zero point.

Figure 6:
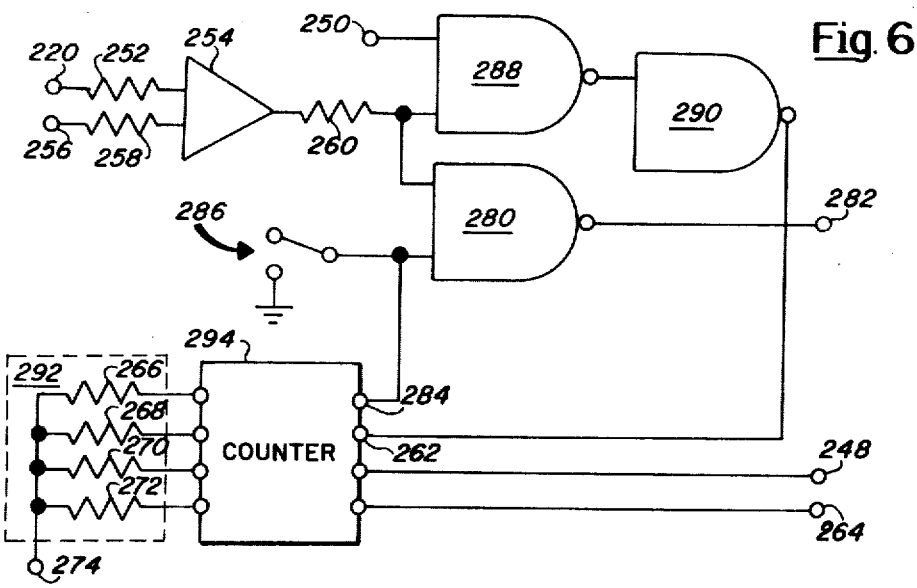
FIG. 6 is an electrical schematic partially in block diagram form showing the automatic tare control circuit portion of the control circuitry.

Scale zero point is determined after the hopper 24 is dumped. After dumping, a short time interval takes place during which the scale settles to a quiescent state. Because of the dynamic viscous damping effect of the scale control circuitry, this settling time is less than that achieved in contemporary weighing systems employing only mechanical components. The settling time interval is controlled by a sysetm sequencer circuit, not shown or described herein, but which controls the overall sequence of the controlled machine with its appurtenant scale functions. The sequencer circuit at the end of the interval applies a reset pulse through terminal 248 to up/down counter 294 (FIG. 6) which resets it to zero. Thereafter, the sequencer circuit applies a tare enable gate pulse at terminal 250 of the automatic tare control circuit (FIG. 6).

The scale output voltage is applied at terminal 220 through resistor 252 to amplifier 254. Simultaneously, the voltage at the lower end of weight set potentiometer 70 (FIG. 4) is applied via terminal 256 and resistor 258 to amplifier 254. If the scale voltage is more negative than the weight set potentiometer voltage, amplifier 254 has a positive output signal. This signal is applied through resistor 260 to NAND 288, which, in turn applies a low or zero signal to NAND 290 during the inverval a gate pulse is present at terminal 250. The resulting positive (one) output of NAND 290 is applied to terminal 262 of counter 294. Terminal 262 is the count enable input to counter 294. The counter counts clock pulses applied at terminal 264 from an external clock oscillator (92) not shown in FIGS. 4 and 6.

Resistors 266, 268, 270 and 272 comprise a four bit digital-to-analog converter 292 which generates a 16 step positive current ramp at its output terminal 274. This current is applied to amplifiers 222 and 224 (FIG. 4) through identical resistor 276 and 278, respectively and causes their voltage outputs to go negative in equal amounts. These increasing negative voltages are applied to both ends of the weight set potentiometer 70 causing its output voltage at terminal 256 to fall. This process continues until the voltages at terminals 256 and 220 of the automatic tare control circuit (FIG. 6) are substantially equal at which point the output of amplifier 254 changes state going negative.

This change in state of the output of amplifier 254 when applied to NAND 280 results in a tare complete signal at its output terminal 282 and through NANDs 288 and 290 an inhibition of further counting in counter 294. The tare complete signal when applied to the sequencer circuit causes it to advance and another weighing cycle to begin.

Two-pole switch 286 is shown set in a position to permit the above described automatic tare control circuitry to function. If switched to its other position, ground is applied to terminal 284 of counter 294 and NAND 280. This resets counter 294, and holds it reset to zero leaving the voltage applied across weight set potentiometer 70 constant at zero.

PRODUCT FEED CUTOFF CONTROL CIRCUITS

Figure 5:
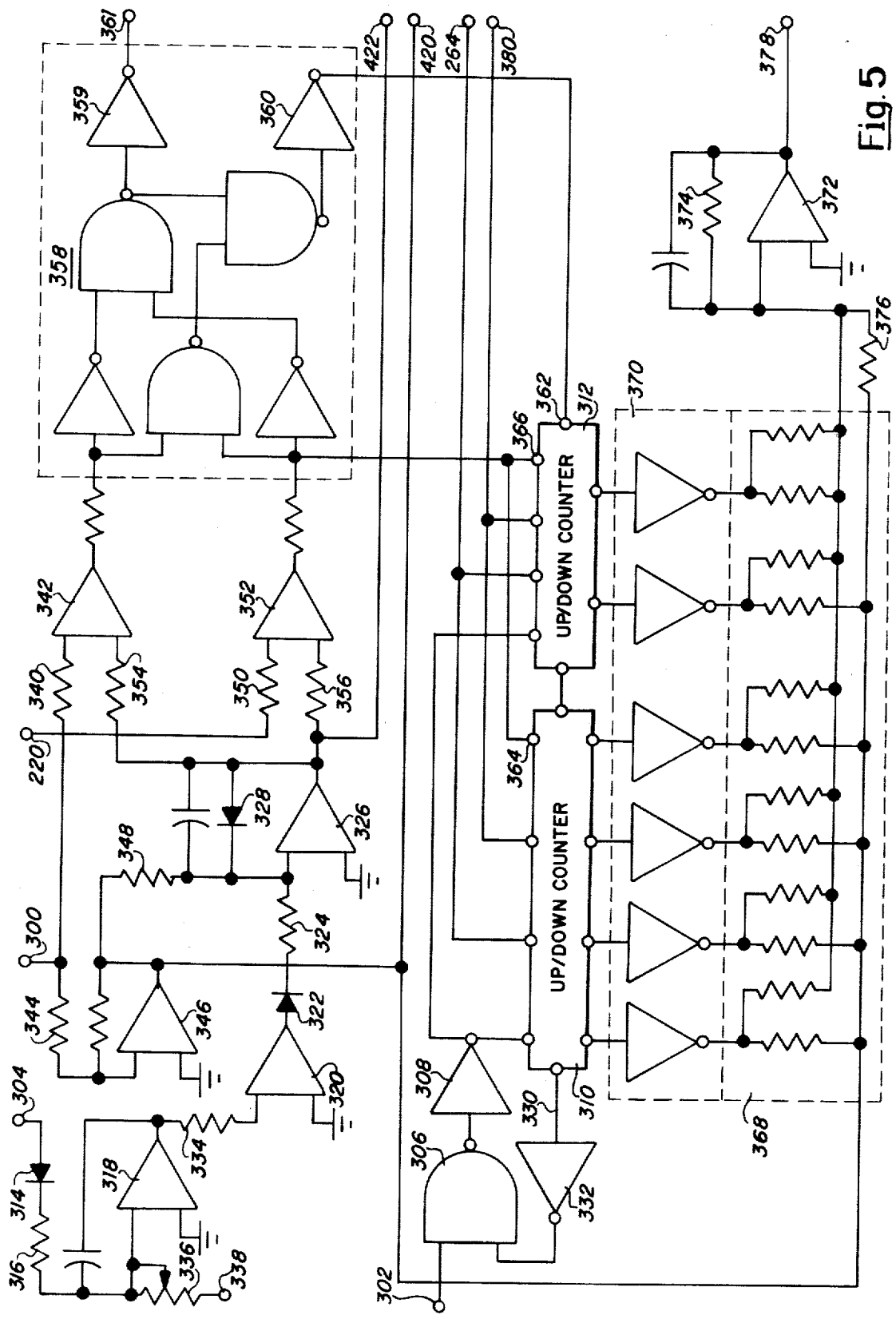
FIG. 5 is a detailed schematic representation of the product feeder cutoff control portion of the control circuitry.

As described above in connection with FIG. 1, the product feeder cutoff point is adjusted after each weighing operation to maintain maximum or bulk feed rate for as long a period as possible. A detailed schematic of that portion of the control circuitry which effects that control automatically is shown in FIG. 5. This circuitry automatically changes the bulk feed cutoff point to maintain a constant weight of delivered product while the product feeder is "on" in the bulk feed mode.

The bulk feed target command signal is generated by potentiometer 98 (FIG. 4) and applied to the cutoff point control circuit of FIG. 5 via terminal 300. An enabling signal generated by the system sequencer circuit (described above) is applied to terminal 302 and its complement to terminal 304. In the quiescent state, the signal on terminal 302 is a logical zero and that on terminal 304, being its complement, is a logical one. The "zero" enabling signal applied to NAND 306 as inverted by inverter 308 is a count enable signal which when applied to up/down counters 310 and 312 prevents the counters from counting by holding the count enable signal at a logical zero.

The logical "one" enabling signal on terminal 304 feeds through diode 314 and resistor 316 to drive the output of amplifier 318 to negative saturation. The output of amplifier 320 is therefore driven to positive saturation and this signal applied through diode 322 and resistor 324 causes the output of ampliifer 326 to be driven negative. Amplifier 326 has a diode 328 in its feedback path which limits the negative output of amplifier 326 to a maximum of 0.5 volts. After the scale settling period, the system sequencer cricuit reverses the state of the enabling signals applied to terminals 203 and 304, applying a logical "zero" to terminal 304 and a logical "one" to terminal 302. This change in state applied to NAND 306 and inverter 308 drives their count enable output signal to a logical "one" if the value stored in up/down counters 310 and 312 is not their maximum capacity. Maximum capacity of the counters is signaled when the carryout signal of counter 310, which includes its carryin signal (the carryout from counter 312), is applied through lead 330 and inverter 332 to NAND 306. This carryout signal applied to NAND 306 locks up the counters 310 and 312 to prevent a meaningless recycling to zero.

When the changed state of the enabling signals applies a logical zero to terminal 304, diode 314 blocks its application to amplifier 318. Without the logical "one" at its input, amplifier 318 becomes an integrator whose output is a positive going ramp applied through resistor 334 to amplifier 320. Slope of the ramp is determined by the setting of potentiometer 336 at the input of amplifier 318, the terminal 338 of potentiometer 336 being connected to a minus 12 volt supply. This ramp signal provides a time delay before the balance of the circuit can be actuated with amplifier 320 acting as a comparator. When the ramp signal at the output of amplifier 318 crosses zero, the output of amplifier 320 is driven to negative saturation at which point its output is blocked by diode 322 thus terminating its effect on amplifier 326.

The bulk feed target command signal voltage at terminal 300 is applied through resistor 340 to amplifier 342 and through resistor 344 to amplifier 346. Amplifier 346 inverts the bulk feed target command signal to a positive signal which is then applied through resistor 348 to amplifier 326. The output of the scale appearing at terminal 220 is applied through resistor 350 to amplifier 352. With no signal input from amplifier 320, amplifier 326 functions as an integrator whose output ramp rate is controlled by the amplitude of the bulk feed target command signal voltage as inverted by amplifier 346. As this ramp rises in a negative direction, its voltage eventually becomes greater than either the bulk feed target command or the scale output voltages. Whenever this occurs, the ramp signal output which is applied to amplifiers 342 and 352 through resistors 354 and 356, respectively, causes the output of these amplifiers to be driven positive. Depending on whether the bulk feed target command signal or the scale output voltage is larger, one of the amplifiers 342 and 352 will switch to a positive output signal before the other. Logic circuit 358 connected to the output of these two amplifiers generates a gate signal at its output whenever the output of either amplifier is positive and the other is negative. This gate signal appears at the output of inverter 360 and is applied to the carryin terminal of up/down counter 312 permitting counters 310 and 312 to count clock pulses applied thereto from terminal 264.

As explained more fully below, since the ramp rate at the output of amplifier 326 is proportional to bulk feed target command voltage, a fixed percent difference between scale output voltage and bulk feed target command voltage will always generate a carryin to counter 312 of the same time regardless of actual weight error. If the output of amplifier 342 switches to positive before amplifier 352, the counters 310 and 312 count upward and the up/$\overline{\text{down}}$ (up not down) control signal controlling count direction is derived directly from the output of amplifier 352 and applied to terminals 364 and 366 of the two counters. As described above, the clock frequency is arbitrarily determined but is selected to cause the feeder cutoff signal to approach its desired or commanded level asymptotically.

The counters continue to count clock pulses until the second of the amplifiers 342 and 350 has its output switch to positive. When that occurs the output gate signal from inverter 360 is terminated and no further counting occurs. At the same time inverter 359 of logic circuit 358 is triggered on generating a "feed complete" signal which is applied to the system sequencer circuit via terminal 361.

Since the feed cutoff control circuit operates on a percentage basis, a fixed magnitude voltage difference between the bulk feed target command voltage and the scale output voltage represents a different percentage error if the cutoff command signal voltage is varied. For this reason, the integrator 326 is driven by the bulk feed target command voltage with the result that the slope of its output voltage ramp is a direct function of that command voltage. If a smaller voltage is commanded the ramp slope is smaller and the counting time permitted by a fixed magnitude differential is increased. Conversely, if the bulk feed target command voltage is increased, the ramp slope is increased and the counting time permitted for the same differential error is decreased.

The foregoing description has indicated the manner in which the count value stored in up/down counters 310 and 312 is adjusted. This count value is applied to a six bit digital-to-analog converter 368 via six open collector inverters contained in one package 370. The inverter sections provide a switch to ground when they are turned on and are essentially inoperative when turned off. The supply voltage of converter 368 is the inverted bulk feed target command voltage generated by amplifier 346 and the final analog voltage output of the converter is thus a function of that command voltage. This output is applied to amplifier 372 which has a feedback resistor 374 to set its gain. The input current command from the converter 368 is in effect the product of the parallel resistance of any of its six branches that are active and, the inverted command voltage. Resistor 376 shunts the converter 368 so that when all six sections of inverter 370 are turned off (counter value = zero), the output of amplifier 372 is equal to the inverted cutoff command voltage. This is achieved through selection of feedback resistor 374. The automatic feed cutoff signal at the output of amplifier 372 is applied via terminal 378 to the scale control circuit (FIG. 4).

The automatic feed cutoff voltage signal appearing at terminal 378 of the FIG. 4 circuitry is applied through resistor 382 to amplifier 384 where it is compared to the scale output voltage. When the scale voltage exceeds that of the cutoff voltage signal by a minute amount, a gate signal is generated at the output of amplifier 384 which is applied through terminal 406 to external circuitry (not shown) which is effective to terminate product bulk feed. The continuous correction action of the circuit just described causes this signal to be generated at a weight level such that the overfeed will add just enough to bring the total bulk feed delivery to the bulk target weight. If the total bulk delivery deviates from the bulk feed target, these correction circuits change the feed cutoff command to eliminate that deviation. Similarly, the output voltage of weight set potentiometer 70 is compared to the scale output voltage by amplifier 400. When the scale output voltage and weight set voltage are substantially identical, a gate signal is generated at the output of amplifier 400 which is applied through terminal 408 to the external sequencer circuitry (not shown). The sequencer circuit is used to actuate machine operation, terminate product dribble feed and/or dump the hopper 24 or any other event dependent upon reaching scale weight.

As an advantageous feature of the invention, means are provided for disabling the automatic cutoff point control circuit. This is simply and easily accomplished by providing logical zero signal at terminal 380. The effect of this signal is to drive both counters 310 and 312 to zero. Since all inverters of package 370 are then "off," amplifier 372 will then follow the bulk feed target command signal without any regard to the difference from the scale output signal.

With the gain of amplifier 372 set so that its output with the counters at zero is equal to the cutoff command signal, it is possible when or where desired, to eliminate the dribble mode of product delivery. If the bulk feed target command voltage is set at 100 percent of the weight command, the automatic cutoff point control circuit will attempt to maintain the bulk product delivery amount at 100 percent of the desired weight. While some degradation in weighing accuracy is incurred, very substantially higher production rates are normally achieved. In some applications where unit product value is low, the higher production rates are more important than extreme weighing accuracy.

PRODUCT FEED RATE CONTROL CIRCUITS

Figure 7:
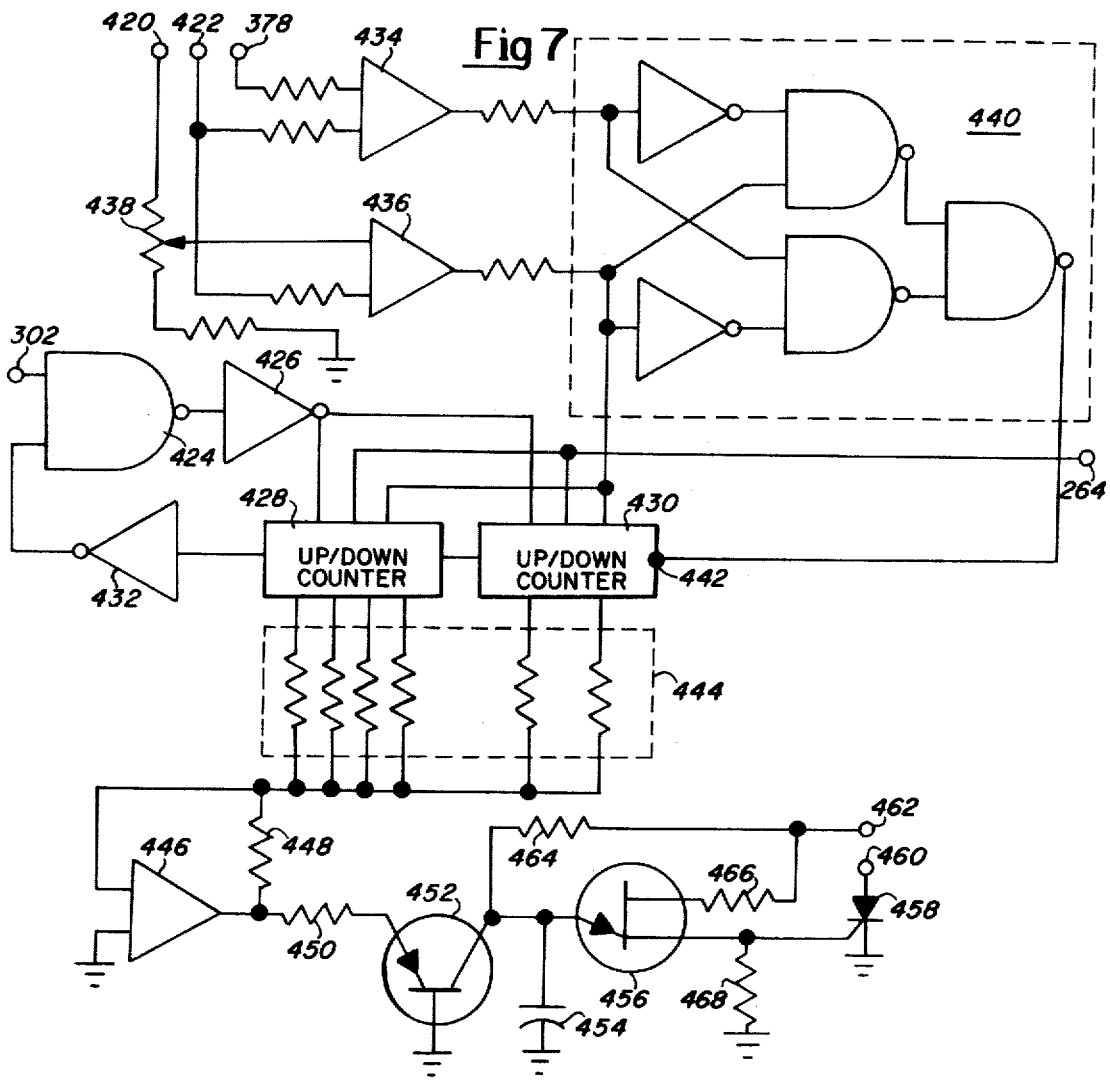
FIG. 7 is an electrical schematic of the bulk feed control circuitry portion of the control circuitry.

During the same time interval in which the automatic feed cutoff control point circuitry is operating to change or correct the cutoff point, the variables affecting product feed rate are sampled and any necessary revisions made to the commanded rate. The backset enable signal generated by the system sequencer circuit (described above but not shown) is applied to the product feed rate control circuit of FIG. 7 through terminal 302. When the enable signal is a logical "one", NAND 424 and inverter 426 pass the carry out signal from cascaded up/down counters 428 and 430 applied at their input via inverter 432. However, if the cascaded counter is at either end of its range, its carryout signal is a logical "zero" with the result that the signal at the output of inverter 426 is a logical zero disabling the counters to prevent a meaningless recycling to zero.

Comparator 434 compares the cutoff control ramp voltage generated by amplifier 326 and applied to terminal 422 to the feed cutoff voltage signal applied to terminal 378. Comparator 436 compares the cutoff control ramp voltage to a preset fraction of the bulk feed target command signal applied to terminal 420. The cutoff voltage signal at terminal 378 is lower than the cutoff command signal on terminal 420 by an amount proportional to product feed rate. The setting of potentiometer 438 determines the percentage of the cutoff command signal which is desired. The actual percentage is empirically determined based upon product and feeder characteristics, the object being to operate the product feeders at as high a rate as possible.

If the product feeders are running slower than the desired rate the cutoff voltage on terminal 378 will be higher than the setting of potentiometer 438 and conversely if the feeders are running faster than desired. The cutoff ramp voltage on terminal 422 is applied to both comparators 434 and 436. As the ramp voltage increases in magnitude in a negative direction, it eventually becomes more negative than either the cutoff signal voltage or the set percentage of cutoff command signal. During the interval when the ramp voltage is more negative than the one and less negative than the other, logic circuit 440 enables the cascaded counters 428 and 430 to count. Direction of count is determined by the output of comparator 436. The cascaded counters 428 and 430 are of a type which will only count when both the carrin signal applied to its terminal 442 by logic circuit 440 and the output of inverter 426 are logical "ones."

Six resistors comprise a digital-to-analog converter 444 connected to the six most significant bits of the cascaded up/down counters 428 and 430. Converter 444 provides an analog output to amplifier 446. Gain of amplifier 446 is established by resistor 448 and the resultant negative output through resistor 450 causes current to flow in the emitter - base junction of transistor 452. Transistor 452 is a common base amplifier whose collector current is essentially equal to emitter current. Hence, transistor 452 collector current shunts charging current from capacitor 454 to slow the voltage rise rate in the emitter of transistor 456. Transistor 456 is a unijunction transistor. Transister 456, resistors 464, 466 and 468 and capacitor 454 comprise a conventional modulating circuit for phase modulation of silicon controlled rectifier 458. Capacitor 454 starts to charge at the beginning of each half cycle of the AC power line and when its charge voltage exceeds the intrinsic stand-off ratio of transistor 456, that transistor conducts heavily discharging capacitor 454 into the gate of silicon controlled rectifier 458. From this it can be seen that a more negative voltage at the output of amplifier 446 will delay the firing of transistor 456, and conversely as the amplifier output is more positive. A DC full-wave rectified unfiltered bias supply for transistors 452 and 456 is applied at terminal 462. The feeder control command signal is applied to the feeder through terminal 460.

The foregoing operation of sampling, comparing and adjusting the feed rate is repeated each product feed cycle until product is being fed at a rate which causes the cutoff voltage signal to equal the percentage of cutoff command signal established by the setting of potentiometer 438.

The foregoing description of the batch weighing system has set forth a system having features which provide great flexibility in operation combined with a higher response rate, great accuracy, and higher linearity than heretofore achievable by a single system. Specifically, the servo controlled force balance described provides the means for achieving these features while simultaneously providing outputs which permit system control to achieve higher product feed rates and automatic tare adjustments which further enhance the system speed and accuracy.

The invention has been described in detail herein with particular reference to preferred embodiments with their distinctive features of construction. However, it will be understood that variations and modifications can be effected within the spirit and scope of the invention, as described hereinabove and as defined in the appended claims.

What is claimed is:

1. In apparatus for the repetitive weighing of a preselected weight wherein bulk products are transported to a scale hopper by means of a product feed device capable of starting and stopping said transportation, the improvement comprising force balance scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage and to generate a conter - EMF proportional to motor armature velocity, and scale servo control circuit means comprising scale amplifier means connected to said pickoff means and said linear electric motor means, said scale amplifier means being responsive to said pickoff output signal to apply a correction voltage signal to said linear electric motor means to counteract those forces due to scale usage, said correction voltage signal being proportional to the weight of a product load in said hopper means, said scale servo control circuit means further comprising summing means and scale feedback amplifier means, said feedback amplifier means being connected to said linear electric motor means and responsive to said counter EMF to generate a scale velocity signal, said summing means being connected between said scale amplifier means and said scale feedback amplifier means and responsive to the output of the latter to modify said correction voltage signal to enable said linear electric motor means to provide the equivalent of viscous damping to said scale beam.

2. Apparatus for the repetitive weighing of a preselected weight in accord with claim 1 further comprising scale output means connected to the output of said scale amplifier means to provide a weight output signal proportional to said correction voltage signal.

3. Apparatus for the repetitive weighing of a preselected weight in accord with claim 2 further comprising adjustment means connected to said scale output means to permit calibration of said weight output signal to a selected range.

4. Apparatus for the repetitive weighing of a preselected weight in accord with claim 3 further comprising automatic feed cutoff control circuit means connected to said scale output means and responsive to said weight output signal to stop the transportation of product by said product feed device a preselected time before said scale hopper means has received said preselected weight of said product comprising weight set potentiometer means for establishing a weight control signal corresponding to a selected product weight, comparison circuit means for comparing said weight control signal and the weight of the product in said scale hopper means and for generating a weight correction signal therefrom, and control means responsive to said weight correction signal and connected to said product feed device to generate an automatic cutoff signal to stop the transportation of product by said feed device.

5. An apparatus for the repetitive weighing of a preselected weight in accord with claim 4 further comprising product feed rate control means connected to said automatic feed cutoff control circuit means and said product feed device to thereby control the speed of the latter at a preselected percentage of the cutoff output command signals of the former comprising feed rate comparison circuit means for comparing the preselected percentage of said cutoff output command signal with said automatic cutoff signal to generate a product feed rate control signal equal to said preselected percentage.

6. Apparatus for the repetitive weighing of a preselected weight in accord with claim 4 further comprising automatic tare weight control means comprising tare weight comparison circuit means for comparing the zero signal of said weight set potentiometer and said weight output signal when said scale hopper means is empty and for generating a correction signal applied to said weight set potentiometer to make said signals equal.

7. Apparatus for the repetitive weighing of a preselected weight in accord with claim 6 further comprising product feed rate control means connected to said automatic feed cutoff control circuit means and said product feed device to thereby control the speed of the latter at a preselected percentage of the cutoff output command signals of the former comprising feed rate comparison circuit means for comparing the preselected percentage of said cutoff output command signal with said automatic cutoff signal to generate a product feed rate control signal equal to said preselected percentage.

8. In batch weighing apparatus where preselected weights of bulk products are transported to a scale hopper by means of a variable speed intermittently operated product feed device, the improvement comprising force balance scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto, and scale signal processing circuit means connected to said pickoff means, said linear electric motor means and said product feed device, said scale circuit means being responsive to said pickoff output signal to apply a correction voltage signal proportional to the weight of a product load in said hopper means to said linear electric motor means to counteract those forces due to scale usage, to control product feed rate to said scale hopper means and to terminate product transportation to said scale hopper means at the time before the preselected weight of the batch is in the scale hopper means that allows for the weight of product flowing at the time of termination and further including means for automatically correcting for discrepancies between the value of the preselected weight of the batch and the value of the actual weight of the batch in the scale hopper means whereby the final batch weight in said scale hopper means is said selected weight.

9. In batch weighing apparatus wherein bulk products are transported to a scale hopper by means of a variable speed intermittently operated product feed device, the improvement comprising force balance scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage and to generate a counter - EMF proportional to motor armature velocity, and scale servo control circuit means connected and responsive to the output of said pickoff means to apply a correction voltage signal to said motor means to restore and maintain said scale beam to its position when no load is in said hopper means, said servo control circuit means comprising amplifier means for generating said correction voltage signal and feedback amplifier means responsive to said counter EMF to modify said correction voltage signal to thereby provide the equivalent of viscous damping to said scale means.

10. A force balance scale system for determining the weight of a product in its hopper, comprising scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage, a product feed device having a variable product feed rate, and scale signal processing circuit means connected to said pickoff means, said linear electric motor means and said product feed device, said scale circuit means being responsive to said pickoff output signal to apply a correction voltage signal proportional to the weight of a product load in said hopper means to said linear electric motor means to counteract those forces due to scale usage, to control product feed rate to said scale hopper means and to terminate product transportation to said scale hopper means at the time before the preselected weight of the batch is in the scale hopper means that allows for the weight of product flowing at the time of termination and further including means for automatically correcting for discrepancies between the value of the preselected weight of the batch and the value of the actual weight of the batch in the scale hopper means whereby the final batch weight in said scale hopper means is said selected weight.

11. A force balance scale system in accord with claim 10 further comprising an AC power source and twin "T" filtering and scale output means connected to the output of said scale signal processing means to provide a weight output signal proportional to the weight in said scale hopper means, said twin "T" filter means being tuned to reject the AC line frequency.

12. A force balance scale system for determining the weight of a product applied to its hopper, comprising scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage and to generate a counter - EMF proportional to motor armature velocity, and scale servo control circuit means connected and responsive to the output of said pickoff means to apply a correction voltage signal proportional to the weight of a product load in said hopper means to said motor means to restore and maintain said scale beam to its position when no load is in said hopper means, said servo control circuit means comprising amplifier means for generating said correction voltage signal and feedback amplifier means responsive to said counter EMF to modify said correction voltage signal to thereby provide the equivalent of viscous damping to said scale means.

13. In batch weighing apparatus wherein preselected weights of bulk products are transported to a scale hopper by means of a variable speed intermittently operated vibratory product feed device, the improvement comprising force balance scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage and to generate a counter - EMF proportional to motor armature velocity, scale servo control circuit means connected and responsive to the output of said pickoff means to apply a correction voltage signal to said motor means to restore and maintain said scale beam to its position when no load is in said hopper means, said servo control circuit means comprising amplifier means for generating said correction voltage signal and feedback amplifier means responsive to said counter EMF to amplify said correction voltage signal to thereby provide the euivalent of viscous damping to said scale means, and twin "T" filtering and scale output means connected to said scale servo control circuit means and responsive to said modified correction voltage signal to provide an output signal proportional to the weight in said scale hopper means, said twin "T" filter being tuned to reject the vibratory frequency of said product feed device.

14. In a method for repetitive batch weighing of a preselected weight of a bulk product which is transported to the scale hopper means of a scale having a balance beam by means of a variable speed intermittently operated vibratory feed device, the steps of determining the displacement of said scale balance beam from a zero point and generating a displacement signal having characteristics proportional to beam displacement, applying a restoring force to said scale balance beam proportional to said displacement signal, generating signals proportional to scale balance beam velocity, combining said signals proportional to scale balance beam velocity with said displacement signal to thereby modify the latter to enable said restoring force to provide the equivalent of viscous damping to said scale balance beam, and selectively filtering said modified displacement signal to remove therefrom the vibratory frequency of said product feed device and thereby provide a weight output signal.

15. The method for repetitive batch weighing in accord with claim 14 further comprising the steps of comparing said preselected weight of bulk product in a batch with the weight of product in said scale hopper means and terminating the operation of said product feed device at the time before said predetermined weight of the batch is in said scale hopper means that allows for the weight of product flowing at the time of said termination whereby the final batch weight in said scale hopper means is said preselected weight, and maintaining the product feed rate at a rate which is the maximum possible without increasing the time interval between product feed termination and the time said scale hopper means attains said preselected weight.

16. A force balance scale system for determining the weight of a product in its hopper, comprising scale means comprising a pivoted scale beam, scale hopper means affixed to said beam, scale pickoff means and a linear electric motor means, said pickoff means being adapted to generate a pickoff output signal proportional to the displacement of said beam, said linear electric motor means being connected to said scale beam and adapted to apply forces thereto to counteract those due to scale usage, a product feed device having a variable product feed rate, and scale signal processing circuit means connected to said pickoff means, said linear electric motor means and said product feed device, said scale circuit means being responsive to said pickoff output signal to apply a correction voltage signal proportional to the weight of a product load in said hopper means to said linear electric motor means to counteract those forces due to scale usage, to control product feed rate to said scale hopper means and to terminate product transportation to said scale hopper means at the time before the preselected weight of the batch is in the scale hopper means that allows for the weight of product flowing at the time of termination whereby the final batch weight in said scale hopper means is said selected weight, said force balance scale system further including an AC power source and twin "T" filtering and scale output means connected to the output of said scale signal processing means to provide a weight output signal proportional to the weight in said scale hopper means, said twin "T" filter means being tuned to reject the AC line frequency.

17. In a method for repetitive batch weighing of a preselected weight of a bulk product which is transported to the scale hopper means of a scale having a balance beam by means of a variable speed intermittently operated feed device, the steps of determining the displacement of said scale balance beam from a zero point and generating a displacement signal having characteristics proportional to beam displacement, applying a restoring force to said scale balance beam proportional to said displacement signal, generating signals proportional to scale balance beam velocity, combining said signals proportional to scale balance beam velocity with said displacement signal to thereby modify the latter to enable said restoring force to provide the equivalent of viscous damping to said scale balance beam, comparing said preselected weight of bulk product in a batch with the weight of product in said scale hopper means and terminating the operation of said product feed device at the time before said preselected weight of the batch is in said scale hopper means that allows for the weight of product flowing at the time of said termination, and following termination of the operation of said feed device, automatically comparing the actual weight of the product deposited in said scale hopper means with the value of said preselected weight and automatically terminating succeeding operations of said product device as required to correct for previous discrepancies between the value of the actual weight deposited and the predetermined weight.

18. The method for repetitive batch weighing in accord with claim 17 further comprising the step of maintaining the product feed rate at a rate which is the maximum possible without increasing the time interval between product feed termination and the time said scale hopper means attains said preselected weight.

19. In a method for repetitive batch weighing of a preselected weight of a bulk product which is transported to the scale hopper means of a scale having a balance beam by means of a variable speed intermittently operated feed device, the steps of determining the displacement of said scale balance beam from a zero point and generating a displacement signal having characteristics proportional to beam displacement, applying a restoring force to said scale balance beam proportional to said displacement signal, generating signals proportional to scale balance beam velocity, combining said signals proportional to scale balance beam velocity with said displacement signal to thereby modify the latter to enable said restoring force to provide the equivalent of viscous damping to said scale balance beam, comparing said preselected weight of bulk product in a batch with the weight of product in said scale hopper means and terminating the operation of said product feed device at the time before said preselected weight of the batch is in said scale hopper means that allows for the weight of product flowing at the time of said termination whereby the final batch weight in said scale hopper means is said preselected weight, and maintaining the product feed rate at a rate which is the maximum possible without increasing the time interval between product feed termination and the time said scale hopper means attains said preselected weight.

20. In a method for repetitive batch weighing of a preselected weight of a bulk product which is transported to the scale hopper means of a scale having a balance beam by means of a variable speed intermittently operated vibratory feed device, the steps of determining the displacement of said scale balance beam from a zero point and generating a displacement signal having characteristics proportional to beam displacement, applying a restoring force to said scale balance beam proportional to said displacement signal, generating signals proportional to scale balance beam velocity, and combining said signals proportional to scale balance beam velocity with said displacement signal to thereby modify the latter to enable said restoring force to provide the equivalent of viscous damping to said scale balance beam.

* * * * *

UNITED STATES PATENT OFFICE
CERTIFICATE OF CORRECTION

Patent No. 3,802,522     Dated April 9, 1974

Inventor(s) Thomas L. Thompson and C. Wayne Lafitte

It is certified that error appears in the above-identified patent and that said Letters Patent are hereby corrected as shown below:

In column 2, line 45, delete "of" and substitute therefor --for--.

In column 4, line 3, delete "Switch" and substitute therefor --Switching--.

In column 6, line 18, delete "weightee" and substitute therefor --weighed--.

In column 6, line 21, delete "weighed" and substitute therefor --the--.

In column 6, line 48, delete "electro-pickoff" and substitute therefor --electro-optical pickoff--.

In column 7, line 63, delete "portional" and substitute therefor --proportional--.

In column 9, line 55, delete "sysetm" and substitute therefor --system--.

In column 11, line 8, delete "203" and substitute therefor --302--.

In column 18, line 63, claim 13, delete "euivalent" and substitute therefor --equivalent--.

In column 19, line 34, claim 15, delete "predetermined" and substitute therefor --preselected--.

Signed and sealed this 8th day of October 1974.

(SEAL)
Attest:

McCOY M. GIBSON JR.
Attesting Officer

C. MARSHALL DANN
Commissioner of Patents